(12) United States Patent
Kwag et al.

(10) Patent No.: US 8,893,837 B2
(45) Date of Patent: Nov. 25, 2014

(54) BATTERY PACK STORING DEVICE AND ELECTRIC VEHICLE INCLUDING THE SAME

(75) Inventors: Nohyun Kwag, Yongin-si (KR); Yonggeol Kwon, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 238 days.

(21) Appl. No.: 13/326,695

(22) Filed: Dec. 15, 2011

(65) Prior Publication Data

US 2012/0322321 A1 Dec. 20, 2012

Related U.S. Application Data

(60) Provisional application No. 61/496,964, filed on Jun. 14, 2011.

(51) Int. Cl.
*B60R 16/04* (2006.01)
*H01R 33/76* (2006.01)

(52) U.S. Cl.
CPC .......... *H01R 33/765* (2013.01); *H01R 2201/26* (2013.01)
USPC ........................................ 180/68.5; 180/65.1

(58) Field of Classification Search
USPC ................. 280/65.1, 68.5; 429/100
See application file for complete search history.

(56) References Cited

U.S. PATENT DOCUMENTS

| | | | | |
|---|---|---|---|---|
| 1,439,430 A * | 12/1922 | Lyhne | ............................ | 429/97 |
| 5,570,752 A * | 11/1996 | Takata | ....................... | 180/206.4 |
| 5,597,225 A * | 1/1997 | Davis | ............................ | 362/473 |
| 5,789,898 A * | 8/1998 | Suzuki et al. | .................. | 320/104 |
| 6,095,270 A * | 8/2000 | Ishikawa | ....................... | 180/68.5 |
| 6,148,944 A * | 11/2000 | Adomi et al. | .................. | 180/220 |
| 6,155,369 A * | 12/2000 | Whittaker | ...................... | 180/220 |
| 6,423,443 B1 * | 7/2002 | Tsuboi et al. | ................... | 429/98 |
| 7,243,937 B2 * | 7/2007 | Ishikawa | .................... | 280/288.4 |
| 7,267,352 B2 * | 9/2007 | Ishikawa | .................... | 280/288.4 |
| 7,320,843 B2 * | 1/2008 | Harrington | ..................... | 429/97 |
| 8,162,191 B2 * | 4/2012 | Tetsuka et al. | ................ | 224/459 |
| 8,220,679 B2 * | 7/2012 | Yoshida et al. | ............... | 224/425 |
| 8,241,158 B2 * | 8/2012 | Ishikawa | ......................... | 474/80 |
| 8,413,947 B2 * | 4/2013 | Chiang | .......................... | 248/553 |
| 2004/0050604 A1 | 3/2004 | Dube et al. | | |
| 2005/0252706 A1 * | 11/2005 | Thomas | ........................ | 180/205 |
| 2013/0216883 A1 * | 8/2013 | Kawatani et al. | ............... | 429/99 |

FOREIGN PATENT DOCUMENTS

JP 2003-040186 A 2/2003
KR 10-2009-0052679 A 5/2009

* cited by examiner

*Primary Examiner* — Jeffrey J Restifo
(74) *Attorney, Agent, or Firm* — Knobbe, Martens, Olson & Bear LLP

(57) ABSTRACT

A battery pack storing device capable of charging and discharging a battery pack and an electric bicycle including the same are disclosed. The battery pack storing device stores a battery pack and provides mechanical and electrical connections to an electric device, such as a vehicle.

16 Claims, 4 Drawing Sheets

BATTERY PACK STORING DEVICE AND ELECTRIC VEHICLE INCLUDING THE SAME

CROSS-REFERENCE TO RELATED APPLICATIONS

This application claims priority to U.S. Provisional No. 61/496,964, titled "BATTERY PACK STORING DEVICE AND ELECTRIC BIKE INCLUDING THE SAME" filed Jun. 14, 2011, which is hereby incorporated by reference in its entirety.

BACKGROUND

1. Field

The disclosed technology relates to a battery pack storage device and an electric bicycle including the same.

2. Description of the Related Technology

Secondary batteries are rechargeable, unlike primary batteries which are not chargeable. Secondary batteries may be manufactured as a battery pack having a battery cell and a charger/discharger circuit. Battery packs are used, for example, for small portable electronic devices such as cellular phones and camcorders, and, for example, as motor-driving power sources for hybrid vehicles or electric vehicles.

Because a conventional bicycle used as transportation means or recreational means requires significant physical strength, especially when bicycle going uphill, electric bicycles have recently been more used. An electric bicycle moves in response to a force generated with a motor, and a battery pack is employed as a motor driving power source of the electric bicycle.

SUMMARY OF CERTAIN INVENTIVE ASPECTS

One inventive aspect is a battery pack storage device, which includes a body having an internal space, and a sidewall portion extending from the body forming a cavity configured to receive a battery pack. The device also includes a circuit within the internal space of the body, and a connection terminal portion configured to electrically connect the circuit with the battery pack.

Another inventive aspect is an electric vehicle. The electric vehicle includes a frame, a seat connected to the frame, and a wheel connected to the frame, where the wheel is configured to be driven so as to propel the vehicle. The vehicle also includes a motor engaged with the wheel and configured to drive the wheel, and a battery pack storage device. The battery pack storage device includes a body including an internal space, a sidewall portion extending from the body forming a cavity configured to receive a battery pack, a circuit within the internal space of the body, and a connection terminal portion configured to electrically connect the circuit with the battery pack. The circuit of the battery pack storage device is configured to connect the battery pack to the motor to energize the motor.

DETAILED DESCRIPTION OF CERTAIN INVENTIVE EMBODIMENTS

Throughout the specification, when an element is referred to as being "electrically connected to" another element, the element may be directly connected to the other element, or intervening elements may be present therebetween. In addition, it will also be understood that the term "comprises" when used in this specification, specifies the presence of components, but does not preclude the presence or addition of one or more other components. Hereinafter, examples of embodiments are described with reference to the accompanying drawings such that they can be made and used by those skilled in the art.

Figure 1:
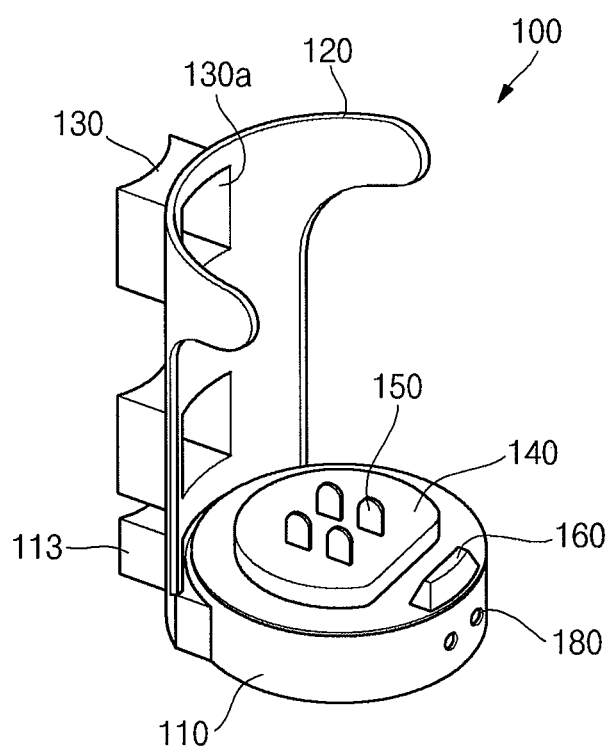
FIG. 1 is a perspective view of a battery pack storage device according to an embodiment.
Figure 2:
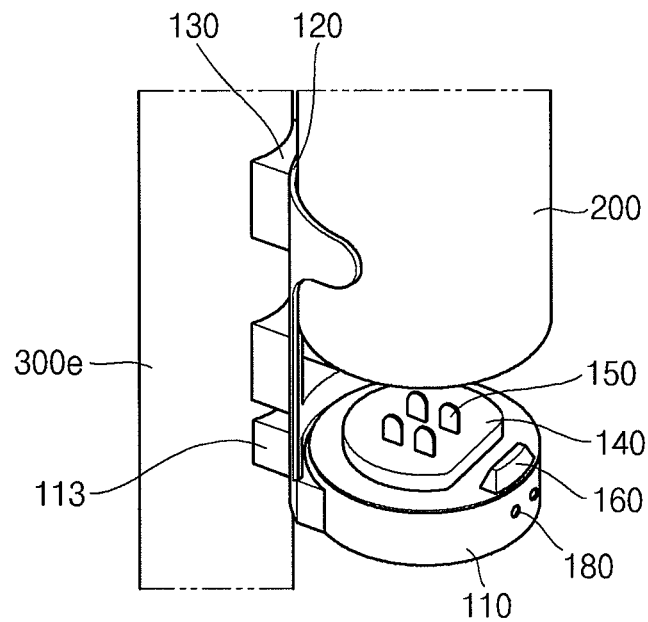
FIG. 2 is a perspective view of a battery pack mounted in the battery pack storage device shown in FIG. 1.
Figure 3:
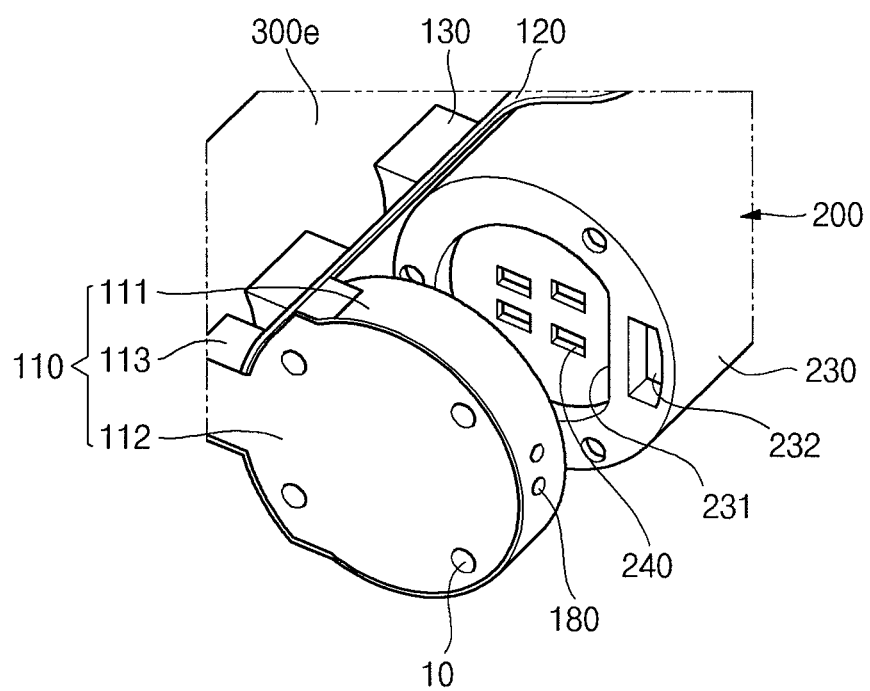
FIG. 3 is a perspective view illustrating a bottom of a body and a bottom of a battery pack in the battery pack storage device shown in FIG. 1.
Figure 4:
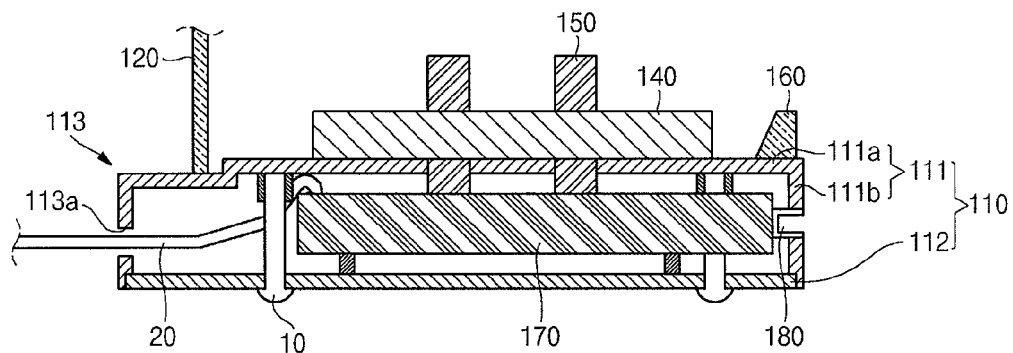
FIG. 4 is a cross-sectional view illustrating part of a body in the battery pack storage device shown in FIG. 1.

FIG. 1 is a perspective view of a battery pack storage device according to an embodiment. FIG. 2 is a perspective view of a battery pack mounted in the battery pack storage device shown in FIG. 1, FIG. 3 is a perspective view illustrating a bottom of a body and a bottom of a battery pack in the battery pack storage device shown in FIG. 1, and FIG. 4 is a cross-sectional view illustrating part of a body in the battery pack storage device shown in FIG. 1.

Referring to FIGS. 1 to 4, the battery pack storage device 100 includes a body 110, a sidewall portion 120, fastening portions 130, a fixing portion 140, a connection terminal portion 150, a locking portion 160, a circuit board 170, and a socket terminal portion 180.

The body 110 has a height and is generally cylindrically shaped having an internal space. In addition, the body 110 has an external side whereon a battery pack 200 is mounted and an internal space wherein the circuit board 170 is stored. In this embodiment, the battery pack 200 is rechargeable and includes at least one battery (210 of FIG. 6), a battery management system (BMS) (220 of FIG. 6) controlling charging and discharging of the battery 210, an insulating case 230 storing the battery 210 and the BMS 220 and has a fixing recess 231 and a locking recess 232 formed therein, and a battery terminal portion 240 in the fixing recess 231, as shown in FIG. 3.

In this embodiment, the body 110 is substantially cylindrical, but in other embodiments other shapes are used. The body 110 may be made of an insulating material. Specifically, the body 110 includes a first part 111 and a second part 112, as shown in FIGS. 3 and 4.

In the illustrated embodiment, the first part 111 is a container having one open surface. Accordingly, the first part 111 has a top surface 111a and side surfaces 111b bent and extending from edges of the top surface 111a. The first part 111 provides a space for storing the circuit board 170.

The second part 112 is shaped as a plate and is disposed at edges of the side surfaces 111b to cover the circuit board 170 stored within the first part 111 and is fixed to the first part 111 by fastening members 10 such as screws.

In addition, the body 110 includes an extension part 113 extending from its one side. The extension part 113 has a wire access hole 113a formed in one side. The wire access hole 113a forms a passage that allows a wire 20 connected to the circuit board 170 to pass through the extension part 113. The wire 20 is connected to a wire connecting portion (not shown) formed on or in a portion of a frame 300e of an electric bicycle corresponding to the wire access hole 113a bicycle when the extension part 113 is connected to the frame 300e. The wire 20 establishes an electrical connection between the motor driving circuit (310 of FIG. 5) of the electric bicycle, a display unit (330 of FIG. 5) and the circuit board 170. Here, wires (not shown) that electrically connect the motor driving circuit (310 of FIG. 5), the display unit (330 of FIG. 5) and the circuit board 170 are disposed on or within the frame 300e of the electric bicycle. In some embodiments, the communications links are wireless between the motor driving circuit (310 of FIG. 5), the display unit (330 of FIG. 5) and the circuit board 170.

The sidewall portion 120 is connected to one side of the body 110 to allow the extension part 113 to penetrate therethrough, and is formed to extend in a height direction from the one side of the body 110. The sidewall portion 120 surrounds and supports at least a portion of the battery pack 200 when the battery pack 200 is mounted in the body 110. An upper portion of the sidewall portion 120 further extends horizontally provide a cavity to stably hold the battery pack 200. The sidewall portion 120 may be integrally formed with the body 110 and may be made of an insulating material.

The fastening portions 130 protrude from the sidewall portion 120 away from the cavity, and may include one or more fastening portions 130 on the extension part 113. One side of each fastening portion 130 is in surface contact with the frame 300e of the electric bicycle. A fastening space 130a is formed within each fastening portion 130. The fastening spaces 130a are exposed to the cavity of the sidewall portion 120. The fastening spaces 130a provide for paths to allow fastening members (not shown) such as screws to penetrate the fastening portions 130 to then be fastened with the frame 300e of the electric bicycle. The fastening portions 130 may be integrally formed with the sidewall portion 120 and may be made of an insulating material.

The fixing portion 140 is formed to protrude from the body 110, and has a width smaller than the body 110. The fixing portion 140 engages with the fixing recess 231 formed in the bottom of the battery pack 200, thereby fixing the battery pack 200 to the battery pack storage device 100. The fixing portion 140 may be integrally formed with the body 110 and may be made of an insulating material. Alternatively, the fixing portion 140 may be formed as a recess in the body 110, rather than a protrusion extending from the body 110. In this case, the fixing recess 231 of the battery pack 200 is replaced with a fixing protrusion. As shown in FIGS. 1 and 2, the fixing portion 140 has a curved portion and a substantially planar portion around its peripheral edge. Other shapes may be used.

The connection terminal portion 150 is installed in or connected to the circuit board 170, as shown in FIG. 4, and extends through the body 110 and the fixing portion 140 to then protrude outwardly. The connection terminal portion 150 engages with the battery terminal portion 240 of the battery pack 200, thereby electrically connecting the circuit board 170 and the battery pack 200. The connection terminal portion 150 includes a plurality of connection terminal portions, and examples thereof may include power terminals and communication terminals. The connection terminal portion 150 may be made of a metallic material. The battery terminal portion 240 of the battery pack 200 may include a conductive terminal (not shown) which contacts the connection terminal portion 150 if inserted into the fixing recess 231 of the case 230. The battery terminal portion 240 may, for example, include a power terminal and a communication terminal corresponding to the connection terminal portion 150.

The locking portion 160 is formed to protrude from the bottom portion 110 and is disposed adjacent to the fixing portion 140. The locking portion 160 is engages with the locking recess 232 of the battery pack 200, thereby locking the battery pack 200 so as to not allow separation if shaken by an external force. The locking portion 160 may be integrally formed with the body 110 and may be made of an insulating material. The locking recess 232 of the battery pack 200 may be formed on the body 110 in the form of a recess. In this case, the locking recess 232 of the battery pack 200 is replaced with a locking protrusion. As shown in FIGS. 1 and 2, in some embodiments, the locking portion 160 is adjacent the substantially planar portion of the fixing portion 140.

The circuit board 170 includes a circuit (not shown) configured to establish an electrical connection between the battery pack 200 and the electric bicycle, and a control unit (171 of FIG. 6) for controlling the electrical connection. The control unit 171 may be implemented as an integrated circuit (IC) chip. The control unit 171 controls charging and discharging of a battery (210 of FIG. 6) of the battery pack 200 stored in the battery pack storage device 100, controls communications between the battery pack 200 and a motor (320 of FIG. 6) of the electric bicycle, receives information of the battery 210 or the motor 320 and causes the state of the battery 210 or the distance to empty (DTE) of the electric bicycle to be displayed on a display unit (330 of FIG. 6). The functions of the control unit 171 are described in more detail below.

The socket terminal portion 180 includes a conductive terminal (not shown) in a recess formed in the other side of the body 110, specifically, the side surface 111b of the first part 111. The socket terminal portion 180 allows a plug of an external charging device to be inserted therein, so that the battery 210 of the battery pack 200 stored in the battery pack storage device 100 receives power from the external charging device to be charged.

As described above, since the battery pack storage device 100 according to the embodiment of the present invention includes the connection terminal portion 150 and the circuit board 170, the battery 210 can be discharged to supply power of the battery 210 included in the battery pack 200 to the motor 320 of the electric bicycle. In addition, since the battery pack storage device 100 includes the socket terminal portion 180, in a state in which the battery pack 200 is stored, for example, the battery 210 included in the battery pack 200 can be charged to supply power from an external charging device to the battery 210. Further, since the battery pack storage device 100 includes either or both of the fixing portion 140 and the locking portion 160, the battery pack 200 can be prevented from separating from the battery pack storage device 100 because of an external force. Additionally, since the battery pack storage device 100 includes the fastening portion 130, it can be detachably fastened to any of a variety of devices including not only an electric bicycle but a conventional bicycle.

Figure 5:
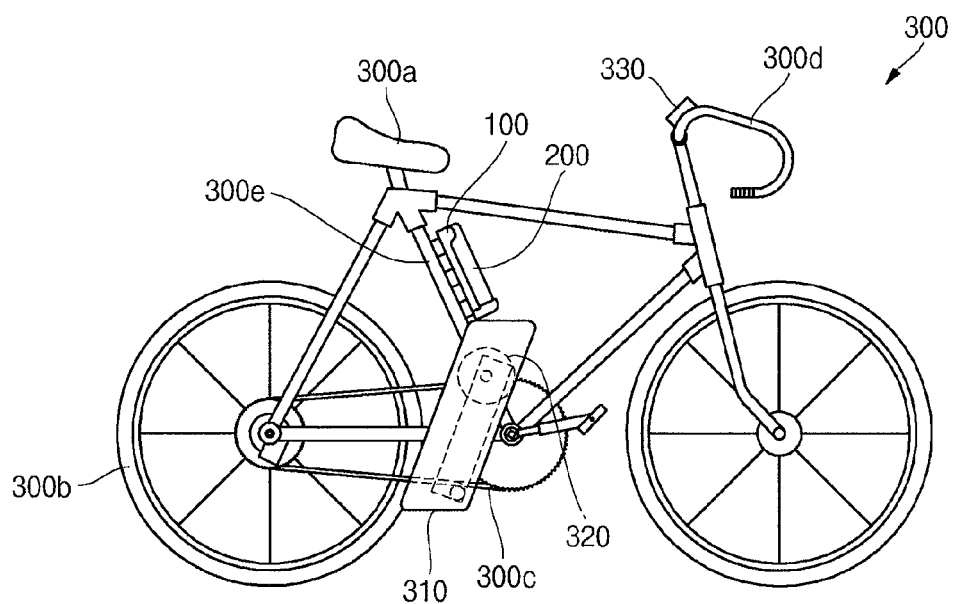
FIG. 5 illustrates an electric bicycle including a battery pack storage device and a battery pack according to an embodiment.
Figure 6:
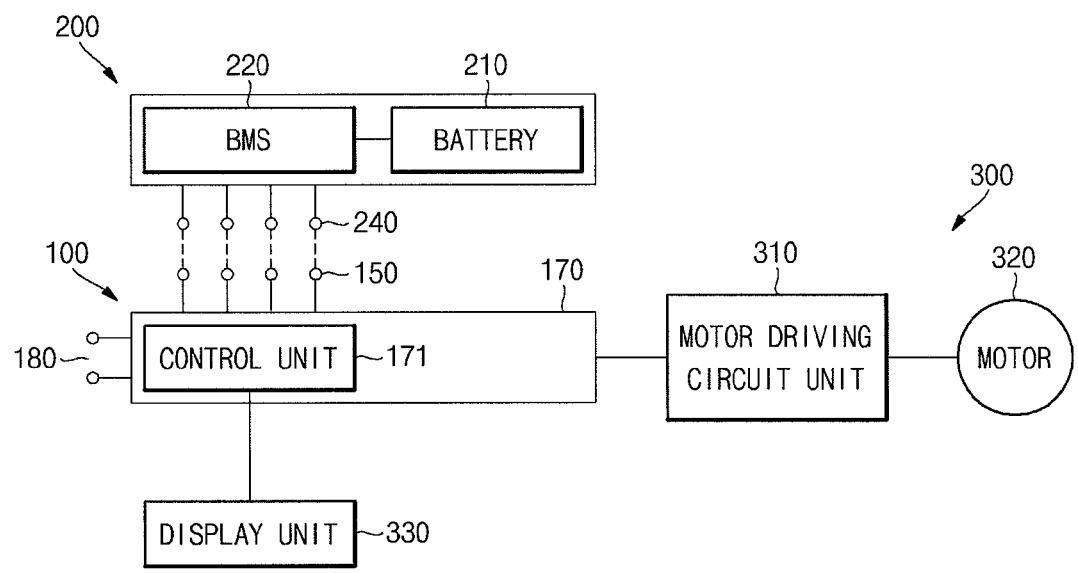
FIG. 6 is a schematic diagram illustrating an electrical connection relationship between a battery pack storage device, a battery pack, and an electric bicycle according to an embodiment. bicycle

FIG. 5 illustrates an electric bicycle including a battery pack storage device and a battery pack according to an embodiment, and FIG. 6 is a schematic diagram illustrating an electrical connection relationship between a battery pack storage device according to an embodiment, a battery pack and an electric bicycle.

Referring to FIGS. 5 and 6, the electric bicycle 300 includes a motor driving circuit unit 310, a motor 320 and a display unit 330. In addition, the electric bicycle 300 includes a seat 300a, wheels 300b, a chain 300c, a handle portion 300d and a frame 300e. The frame 300e is configured to connect the seat 300a, the wheels 300b, the chain 300c and the handle portion 300d. In the electric bicycle 300, the battery pack storage device 100 is mounted on the frame 300e, and the battery pack 200 is stored in the battery pack storage device 100.

If the battery pack 200 is stored in the battery pack storage device 100 mounted on the frame 300e of the electric bicycle 300, the battery pack 200 is electrically connected to the control unit 171 of the circuit board 170 by engagement of the connection terminal portion 150 and the battery terminal portion 240. If the control unit 171 senses a current or a voltage of the motor 320 through the motor driving circuit unit 310, a motor connection signal is generated and transmitted to the BMS 220 of the battery pack 200. The motor connection signal communicates to the battery pack 200 that the control unit 171 is electrically connected to the motor 320. The motor connection signal is transmitted to the BMS 220 of the battery pack 200 through communication terminals of the connection terminal portion 150 and the battery terminal portion 240.

The BMS 220 enters into a wake-up mode to allow the battery 210 to be dischargeable. If the control unit 171 senses that a motor control switch (not shown) of the electric bicycle 300 is turned on by a user, the power of the battery 210 supplied through power terminals of the connection terminal portion 150 and the battery terminal portion 240 is supplied to the motor 320 under the control of the motor driving circuit unit 310. If the battery pack storage device 100 is mounted on the frame 300e of the electric bicycle 300, the motor driving circuit unit 310 may be electrically connected to the control unit 171 and may drive the motor 320 under the control of the control unit 171. The motor 320 is connected to the motor driving circuit unit 310 to be driven or not to be driven by the motor driving circuit unit 310. The motor 320 is a power generator, which moves the electric bicycle 300.

In addition, the control unit 171 receives information about the battery 210 from the BMS 220, for example, the remaining capacity of the battery 210, and is configured to selectively cause the received information to be displayed on the display unit 330, thereby allowing the user to know the state of the battery 210. For example, the display unit 330 may provide an indication that the remaining capacity of the battery 210 is low so that the user understands that the battery 210 needs to be charged. Accordingly, if the external charging device is electrically connected to the circuit board 170 through the socket terminal portion 180 by the user, the charging operation of the battery 210 included in the battery pack 200 may be performed under the control of the control unit 171 and the BMS 220. Here, the BMS 220 of the battery pack 200 is in a wake-up mode to make the battery 210 chargeable.

In addition, the control unit 171 receives information concerning the motor 320, such as a torque of the motor 320. The control unit 171 may calculate the DTE of the electric bicycle 300 and cause the calculated DTE to be displayed on the display unit 330, thereby allowing the user to know of the DTE of the electric bicycle 300.

Further, the control unit 171 may receive information related to an identification (ID) of the battery pack 200 from the BMS 220 and may determine whether the received ID is identical with pre-stored ID to determine whether the battery pack 200 is compatible or not. If the control unit 171 determines that the battery pack 200 is not compatible, an indication that a compatible battery pack should be installed may be displayed on the display unit 320.

If the battery pack 200 is removed from the battery pack storage device 100, the battery pack 200 is electrically disconnected from the control unit 171 of the circuit board 170. In this case, the BMS 220 is unable to receive the motor connection signal from the control unit 171. Thus, the BMS 220 may enter into a sleep mode and stop the charging and discharging operations of the battery 210.

Although various aspects and features have been described with reference to the various embodiments, the foregoing disclosure should be interpreted as illustrative only and it should be understood that various modifications and variations can be easily made by those skilled in the art without departing from the spirit of the invention.

What is claimed is:

1. A battery pack storage device, comprising:
  a body comprising an internal space;
  a sidewall portion extending from the body forming a cavity configured to receive a battery pack;
  a circuit within the internal space of the body;
  a connection terminal portion configured to electrically connect the circuit with the battery pack; and
  a fixing portion configured to releasably secure the body to the battery pack,
  wherein the fixing portion comprises a peripheral edge which comprises a substantially planar portion and a curved portion and the device further comprises a locking portion configured to releasably secure the body to the battery pack, wherein the locking portion is adjacent to the substantially planar portion of the fixing portion.

2. The device of claim 1, further comprising a fastening portion extending from the sidewall away from the cavity, the fastening portion configured to connect the battery pack storage device to another object.

3. The device of claim 1, wherein the connection terminal portion extends through the body to engage the battery pack.

4. The device of claim 1, wherein the fixing portion comprises a recess in the body or a protrusion from the body and is configured to engage with a protrusion from the battery pack or a recess in the battery pack.

5. The device of claim 1, wherein the locking portion comprises a protrusion from the body or a recess in the body and is configured to engage with a recess in the battery pack or a protrusion from the battery pack.

6. The device of claim 1, further comprising a socket terminal configured to electrically connect the battery pack to a charging device configured to charge the battery pack.

7. The device of claim 1, wherein the fixing portion is integrally formed with the body, and wherein the fixing portion and the body are made of an insulating material.

8. An electric vehicle, comprising:
  a frame;
  a seat connected to the frame;
  a wheel connected to the frame, wherein the wheel is configured to be driven so as to propel the vehicle;
  a motor engaged with the wheel and configured to drive the wheel; and
  a battery pack storage device, comprising:
    a body comprising an internal space;
    a sidewall portion extending from the body forming a cavity configured to receive a battery pack;
    a circuit within the internal space of the body; and
    a connection terminal portion configured to electrically connect the circuit with the battery pack,
  wherein the circuit of the battery pack storage device is configured to connect the battery pack to the motor to energize the motor, and
  wherein the vehicle further comprises:
    a fixing portion configured to releasably secure the body to the battery pack wherein the fixing portion comprises a peripheral edge which comprises a substantially planar portion and a partially curved portion; and a locking portion configured to releasably secure the body to the battery pack, wherein the locking portion is adjacent to the substantially planar portion of the peripheral edge of the fixing portion.

9. The vehicle of claim 8, further comprising a display device, wherein the circuit of the battery pack storage device is further configured to cause information regarding the battery pack to appear on the display device.

10. The vehicle of claim 9, wherein the information comprises an estimate of a distance a remaining charge of the battery pack can propel the vehicle.

11. The vehicle of claim 8, wherein the circuit of the battery pack storage device is further configured to control the motor.

12. The vehicle of claim 8, wherein the connection terminal portion extends through the body to engage the battery pack.

13. The vehicle of claim 8, wherein the fixing portion comprises a protrusion from the body or a recess in the body and is configured to engage with a recess in the battery pack or a protrusion from the battery pack.

14. The vehicle of claim 8, wherein the locking portion comprises a protrusion from the body or a recess in the body and is configured to engage with a recess in the battery pack or a protrusion from the battery pack.

15. The vehicle of claim 8, further comprising a socket terminal configured to electrically connect the battery pack to a charging device configured to charge the battery pack.

16. The vehicle of claim 8, wherein the circuit comprises a control unit.

* * * * *